Patented Aug. 13, 1935

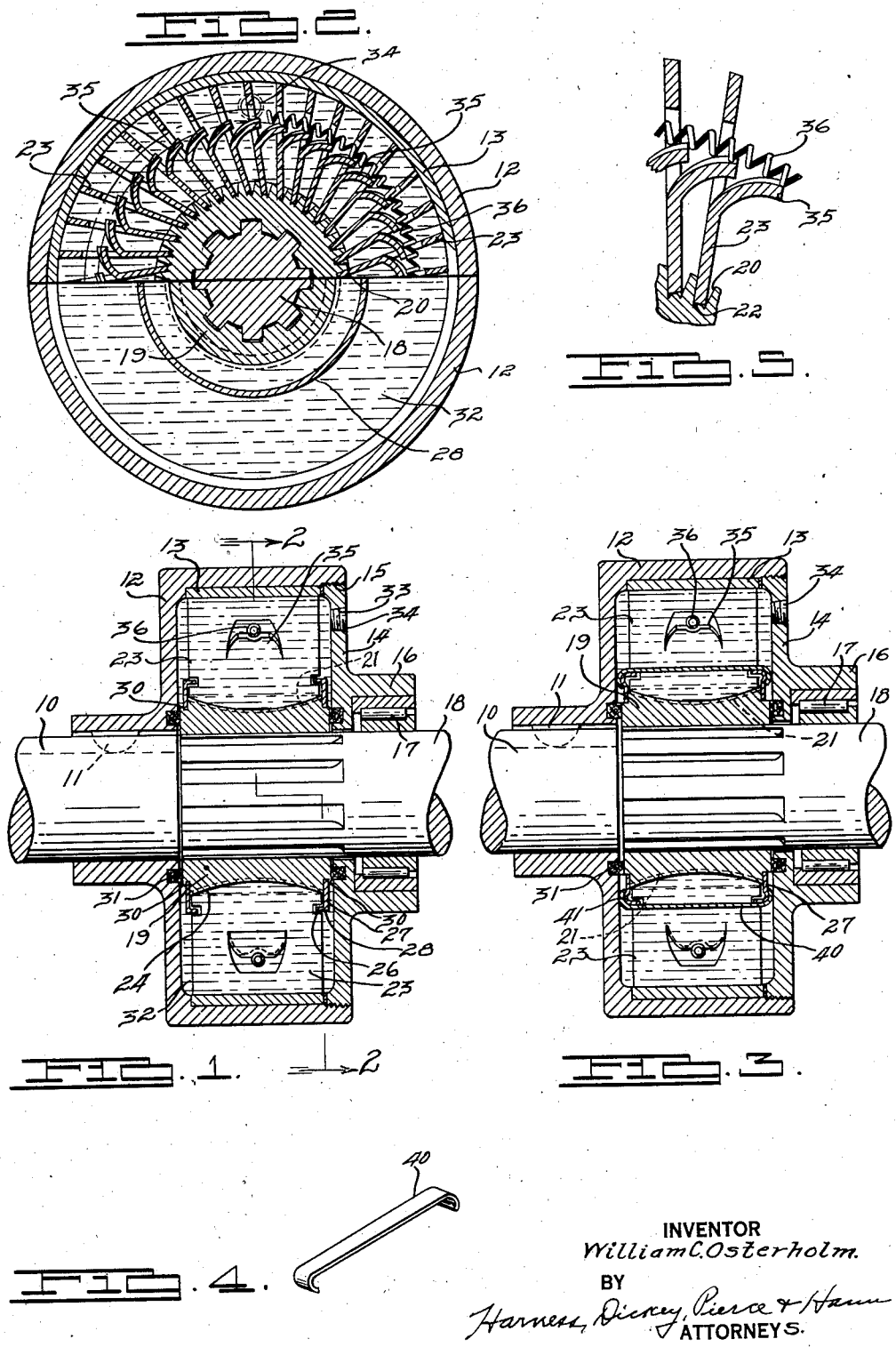

2,010,885

UNITED STATES PATENT OFFICE 2,010,885

CLUTCH

William C. Osterholm, Oak Park, Ill.

Application May 9, 1931, Serial No. 536,216

18 Claims. (Cl. 192—41)

This invention relates to clutch mechanisms and it has particular relation to a clutch of the one way operating type, wherein a driving member rotates a driven member in one direction but freely rotates in the other direction.

Generally, the invention constitutes an improvement over the clutch embodied in my prior application for patent Serial No. 522,943, filed March 16, 1931.

The principal objects of the invention are to provide an improved clutch wherein the area of driving engagement between the driving and driven members may be greatly increased and evenly distributed; to provide an improved clutch wherein back lash or take up is substantially eliminated; to provide an improved clutch which cushions the driving connection and thereby graduates changes in torsional strain occurring between the driving and driven members; to provide an improved clutch having a series of blades disposed between the driving and driven members and supported on one of the members in an improved manner; to provide a clutch of this character wherein liquid, preferably a lubricant, is utilized for moving the blades into their operative and inoperative positions; to provide a clutch of this character wherein means are employed for positively retaining the blades on one of the rotary members, and to provide a one way operating clutch in which heat generated by friction is reduced to a minimum if not entirely avoided.

For a better understanding of the invention, reference may be had to the accompanying drawing forming a part of the specification, wherein:

Fig. 1 is a longitudinal cross-sectional view of a clutch constructed according to one form of the invention;

Fig. 2 is a cross-sectional view taken substantially along the line 2—2 of Fig. 1.

Fig. 3 is a longitudinal cross-sectional view similar to that shown by Fig. 1, illustrating another form of the invention;

Fig. 4 is a perspective view of a clip utilized in the construction shown by Fig. 3;

Fig. 5 is a fragmentary cross-sectional view on a larger scale, of the construction shown by Fig. 1 illustrating the particular manner in which the blades are supported on one of the rotary members.

Referring to Fig. 1, a shaft 10 is provided which is keyed as indicated at 11 to a cup-shaped casing member 12 having a lining 13 composed of suitable, hardened material. A cover plate 14 threaded as indicated at 15, is provided to close the open end of the casing 12. The plate 14 is provided with a hub element 16 which contains roller bearings 17 rotatably supporting a second shaft 18 extending into the casing 12. A hub member 19 is fitted to the splined end of the shaft 18, and is of such axial length that it fits closely between the casing 12 and the cover plate 14 although it is rotatable with respect to both of these elements.

As best shown by Figs. 2 and 5, the hub member 19 is provided with a series of equally spaced, axially extending grooves 20, the sides of which converge toward the base of the grooves to form them into substantially V shape. The base of each of the grooves, as indicated at 21 in Figs. 1 and 3, is curved in a direction axially of the shaft 18 in such manner that the intermediate portion of the base is nearest the shaft while the ends of the base are on substantially the same level and spaced a greater distance from the shaft. Also as indicated at 22 in Fig. 5, the base of each groove is of substantially semi-cylindrical contour with the curved surface thereon extending in a general circumferential direction with respect to the hub member. A blade 23 is partially located in each of the grooves 20 in the hub member 19 and is provided with an inner edge 24 arcuate axially of the hub, corresponding to the axial curvature of the base of the groove, which contacts with the semi-cylindrical surface defining the base of the groove. The edge surface of the blade located in the groove and contacting with the base thereof, is directed substantially normal to the side faces of the blade and consequently the blade has a line contact with the base of the groove regardless of the position of the blade. This line contact between the blade and the base of the groove facilitates moving the blade circumferentially of the hub member with the semi-cylindrical base line in the groove serving as a fulcrum. The outer edge of the blade extends substantially parallel to the axis of the shaft 10 and normally contacts with the inner periphery of the lining 13.

Each of the blades is provided with slots 26 in its side edges and an annular member 27 having a central opening for receiving a reduced portion of the hub member 19 at each end of the blades is provided with a peripheral flange 28 projecting loosely into the slots in the blades. The members 27 being substantially inextensible radially of the hub 19 prevent the blades from being displaced by the centrifugal forces developed by the rotating hub and positively insure the retention of the blades in operative position relative to their seats in the hub. The outer ends of the hub member may be swedged outwardly slightly at their outer edge as indicated at 30 for the purpose of preventing accidental removal of the members 27 from the hub member. Annular sealing elements 31 disposed in annular grooves in the casing 12 and cover plate 14 at the ends of the hub member 19, and which project against the end walls of the hub member, seal the annular space around the blades and the outer periphery of the hub member. This space is filled with a liquid such as a lubricant 32 which may be poured into the casing through an opening 33 in the cover plate 14 that is normally closed by means of a threaded plug 34. This liquid also serves as an inertia means in a manner to be described.

As particularly set forth in my previous application for patent each blade intermediate its inner and outer edges has a tongue 35 extending in a substantially circumferential direction at its outer end, which is formed by stamping out a part of the metal in the blade and bending it about its inner edge out of the plane of the blade. The side edges of the tongue thus formed and the side edges of the opening resulting from bending the tongue out of the plane of the blade, converge slightly in an outward direction which permits the projection of one tongue into the opening in an adjacent blade. An annular helical spring 36 threaded through the opening in the blade outwardly of the tongue 35 engages the end portion of each tongue at a point so located that the blades are urged in a clockwise direction as shown in Fig. 5 by the contractile resiliency of the spring. In other words, a radial line passing through the point of contact between the spring and the tongue on one of the blades is disposed slightly to the right of the contact between the inner edge of the blade and the base of the groove in the hub member, as seen in Fig. 5, and accordingly the action of the spring will tend to move the blade toward the lining 13 in the direction previously mentioned.

The construction shown by Fig. 3 is very similar to that shown by Fig. 1 with the exception that the annular members 27 for retaining the blades on the hub member are retained on the hub member by a plurality of clips 40 extending axially between the blades at intervals around the periphery of the hub member. The annular member 27 in this construction has a slightly bulged portion 41 which is adapted to cooperate with the curved end of the clip 40 and retain the members 27 and the clips firmly locked together.

It is apparent from the foregoing description that if the hub member 19 is positively rotated by shaft 18 in a counter clockwise direction as seen in Fig. 2, the blades 23 will be wedged between the outer periphery of the hub member and the inner periphery of the lining 13, the outer edges of the blades will bite through the liquid film between such edges and the lining, and the blades will connect the hub member and lining in driving relation. The liquid 32 in the casing, tending to stay at rest, will forcefully urge the blades toward radial positions and hence into their wedging positions. Should the hub member stop rotating in a counterclockwise direction, the liquid 32, tending to continue moving, will collapse the blades and will gush between the outer edges of the blades and the lining 13, effectively eliminating frictional contact between the blades and lining. Similarly, should the hub member rotate clockwise, the blades will be collapsed by the liquid. The liquid in the casing is sealed from escape and will last substantially as long as the clutch.

A clutch of the character described is particularly useful in motor vehicles wherein it is desired to have a clutch that will operate in one direction for the purpose of connecting two shafts in driving relation but which will permit free rotation of one of the shafts with respect to the other when rotating in the other direction. It is apparent that each of the blades can freely move to and from its operative position because of the line contact fulcrum between the inner edge of the blade and the hub member. Also it is apparent that the blades in the clutch are maintained assembled with the hub positively although the retaining means permit normal movement of the blades in the operation of the clutch. Providing an axially curved inner edge on the blade and a correspondingly curved base in the groove in the hub member permits a pivotal movement of each blade in a plane parallel to the axis of the shaft and therefore permits such adjustment of the blade automatically that the outer edge surface thereof will contact with the lining 13 throughout its length. This is particularly desirable because it enables the blade to assume a position in which its inner and outer edges fully contact with the lining 13 and the hub member 19 respectively.

The use of a liquid in the clutch casing for actuating the blades into and out of operative positions provides a positive actuator that exerts pressure equally against all exposed surfaces of the blades and insures positive and immediate action when the direction of rotation is reversed. The actuating pressures exerted by the liquid are increased by the speed of rotation and continually urge the blades to operative or inoperative position depending upon direction of rotation. The liquid on account of its inherent fluid character can not fail to respond to the rotative action of the parts and to exert its force against the blades in the proper direction.

Also it is apparent that the blades are retained on the hub independently of the spring 36, and if the spring should break, or even be omitted, the V shape grooves in the hub member would limit pivotal movement of the blades, while the liquid 32 would urge them, depending on direction of rotation, into wedging relation with the hub member or conversely into such collapsed positions that the outer edges of the blades would be separated from the casing by liquid.

Although only certain forms of the invention have been illustrated and described in detail it will be apparent to those skilled in the art that various modifications may be made without departing from the scope of the appended claims.

I claim:

1. A clutch for transmitting rotary movement of one shaft to another, comprising a pair of shafts, a casing on one shaft, a hub member in the casing and connected to the other shaft, blades angled between the hub member and casing, means for urging the blades into operative engagment with the casing and hub member, and a liquid in the casing which urges the blades in different directions when the casing or hub member is rotated in opposite directions, respectively.

2. A clutch for transmitting rotary movement from one shaft to another, comprising an inner hub member on one shaft, an outer member on the other shaft, one of said members having grooves in its surface adjacent the other member, blades partially disposed in the grooves and normally engaging the other member and means for positively retaining the blades in the grooves, said means comprising an inextensible annular member secured to one of said members and extending through recesses in the blades.

3. A clutch for transmitting rotary movement from one shaft to another, comprising a pair of shafts, a casing on one shaft, the other shaft projecting into the casing and being rotatable with respect thereto, circumferentially spaced clutch elements in the casing for directly engaging and connecting the shaft and casing in driving relation and fluid inertia means in the casing for controlling the clutch elements.

4. A clutch for transmitting rotary movement from one shaft to another, comprising a pair of shafts, a casing on one shaft, the other shaft projecting into the casing and being rotatable with respect thereto, clutch elements in the casing and fulcrumed at fixed points on one shaft for connecting the shafts in driving relation and a liquid in the casing for controlling the clutch elements by inertia of the liquid.

5. A clutch for transmitting rotary movement from one shaft to another, comprising a pair of shafts, a casing on one shaft, the other shaft projecting into the casing and being rotatable with respect thereto, clutch elements disposed in biased positions between the casing and second shaft for connecting them in driving relation, means for limiting the movement of the blades toward more biased positions, and a liquid in the casing for controlling the movement of the blades upon rotation of a shaft as a result of the inertia of the liquid.

6. In a clutch for transmitting rotary movement from one shaft to another, a pair of shafts, movable blades between parts of the shafts for directly engaging and connecting them in driving relation in one direction, and fluid inertia means for controlling the movement of the blades upon rotation of a shaft.

7. In a clutch for transmitting rotary movement from one shaft to another, a pair of shafts, movable clutch blades between parts of the shafts for directly engaging and connecting them in driving relation, and fluid inertia means for controlling the movement of the blades.

8. A clutch for transmitting rotary movement of one shaft to another, comprising a pair of shaft members, blades on one shaft member biased into operative engagement with the other shaft member and having opposed edge contact with the rigid portions of the members, respectively, and means pivotally mounting the edges of the blade at one side thereof on one shaft member for pivotal movement circumferentially thereof and for pivotal movement in planes substantially parallel to the axis of the shaft.

9. A clutch for transmitting rotary movement of one shaft member to another, comprising a pair of shaft members, blades for operatively connecting the shaft members and having opposed edge contact with rigid portions of the members respectively, and means for pivotally mounting the blades on one shaft member for pivotal movement in planes substantially parallel to the shaft and for pivotal movement circumferentially of the shaft axis.

10. A clutch for transmitting rotary movement of one shaft member to another, comprising a pair of shaft members, blades for operatively connecting the shaft members and having opposed edge contact with rigid portions of the shaft members respectively, said blades being pivotally mounted on one shaft member for pivotal movement in planes substantially parallel to the shaft, and being of greater length between such edges than the radial distance between the parts of the shaft members engaged.

11. A clutch for transmitting rotary movement of one shaft member to another comprising a pair of shaft members, blades for operatively connecting the shaft members and having opposed edge contact with rigid portions of the members respectively, means for pivotally mounting said blades on one shaft member for pivotal movement in planes substantially parallel to the shaft and pivotal movement circumferentially of the shaft axis, and means normally maintaining the blades in edge contacting relation to the shaft members.

12. A clutch for transmitting rotary movement comprising inner and outer members, blades movably mounted on one of the members and disposed between them and having opposed edge contacts with rigid portions of the members respectively, the mounting of the blades being such as to allow them to move substantially in their own planes, thereby allowing the blades to assume positions in which the edges thereof have proper contact with one of the members.

13. A clutch for transmitting rotary movement comprising inner and outer members disposed in spaced relation, blades disposed between the members in normally biased positions and having their inner and outer edges normally contacting with the inner and outer members, and means for mounting the inner blades on the inner member so as to permit rocking of the blades in substantially their own plane whereby the outer edges of the blades may move into proper and uniform contact with the outer member along the edge faces.

14. A clutch for transmitting rotary movement from one shaft to another, comprising inner and outer members, blades between the members and having opposed edge face contacts with rigid portions of the members respectively, and means mounting the blades on one member for pivotal movement circumferentially of such member, and movement in planes substantially parallel to the shaft axis.

15. A clutch for transmitting rotary movement from one shaft to another comprising a pair of shafts, inner and outer members on the shafts respectively, one of said members having axially extending grooves, and pivotal blades partially disposed in the grooves and adapted to be moved toward radial positions and into wedging engagement with the other member, said blades having line contact with the bases of the grooves irrespective of their position in said grooves.

16. In a clutch for transmitting rotary movement from one shaft to another, a pair of shafts, inner and outer members on the shafts respectively, a plurality of blades spaced circumferentially between the members and being pivotally mounted on one member and being adapted to be biased toward radial positions and into wedging engagement with the other member, and fluid inertia means for controlling the movement of the blades upon rotation of one shaft.

17. In a clutch for transmitting rotary movement from one shaft to another, a pair of shafts, inner and outer members on the shafts respectively, a plurality of blades spaced circumferentially between the members and being pivotally mounted on one member and being adapted to be biased toward radial positions and into wedging engagement with the other member, common means for biasing the blades toward said radial positions, and fluid inertia means for controlling the movement of the blades upon rotation of one shaft.

18. A clutch for transmitting rotary movement from one shaft to another comprising a pair of shafts, an outer member on one shaft, an inner member on the other shaft and having a circumferentially spaced series of axially extending grooves, blades disposed between the members and having their inner edge portions fulcrumed in the grooves, common spring means for biasing the blades toward radial positions and into wedging engagement with the outer member, and means including annular retainer rings at the axial ends of the blades for maintaining the latter in the grooves while permitting their pivotal movement for clutch action purposes.

WILLIAM C. OSTERHOLM.